US005251444A

United States Patent [19]

Ochiai et al.

[11] Patent Number: 5,251,444

[45] Date of Patent: Oct. 12, 1993

[54] HYDRAULIC DRIVE SYSTEM AND VALVE APPARATUS

[75] Inventors: Masami Ochiai, Atsugi; Takashi Kanai, Kashiwa, both of Japan

[73] Assignee: Hitachi Construction Machinery Co., Ltd., Tokyo, Japan

[21] Appl. No.: 768,189

[22] PCT Filed: Jul. 4, 1991

[86] PCT No.: PCT/JP91/00903

§ 371 Date: Oct. 16, 1991

§ 102(e) Date: Oct. 16, 1991

[87] PCT Pub. No.: WO92/01163

PCT Pub. Date: Jan. 23, 1992

[30] Foreign Application Priority Data

Jul. 5, 1990 [JP] Japan ................................ 2-176273

[51] Int. Cl.[5] ............................................ F16D 31/02

[52] U.S. Cl. ...................................... 60/452; 60/426; 91/518; 91/446

[58] Field of Search ................ 60/420, 426, 422, 427, 60/452, 459; 91/511, 518, 444, 446, 447

[56] References Cited

U.S. PATENT DOCUMENTS 4,425,759 1/1984 Krusche .
4,542,678 9/1985 Kochedorfer et al. ........... 91/447 X
4,624,445 11/1986 Putnam ........................... 91/447 X
5,101,629 4/1992 Sugiyama et al. ................ 60/494 X
5,129,229 7/1992 Nakamura et al. ............... 91/518 X
5,146,747 9/1992 Sugiyama et al. ................ 91/446 X

FOREIGN PATENT DOCUMENTS 366815 5/1990 European Pat. Off. .
57-116965 7/1982 Japan .
60-11704 1/1985 Japan .
2195745 10/1986 United Kingdom .

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

A valve apparatus (30) of a hydraulic valve system has a plurality of directional control valves (78, 79) that control the flow of the hydraulic fluid to a plurality of actuators (34, 35). Check valves (59, 60) are provided for taking out, as a first control pressure, a maximum load pressure among load pressures of the plurality of actuators, first pressure generating devices (89, 91) for generating second control pressures different from the first control pressure, and second pressure generating devices (90, 92) for generating third control pressures different from said first and second control pressures. Flow control valves (36, 39) control flow rates of the hydraulic fluid passing between supply passages (42, 43) and first passages (44, 45) dependent upon openings of variable restrictors (52, 53; 54, 55) disposed therebetween, and also for selectively communicating between second passages (50, 51) and load passages (46, 47; 48, 49), and pressure control valves (70, 71) disposed between the first passages and the second passages for controlling pressures inside the first passages.

10 Claims, 10 Drawing Sheets

HYDRAULIC DRIVE SYSTEM AND VALVE APPARATUS

TECHNICAL FIELD

The present invention relates to a hydraulic drive system and a valve apparatus, and more particularly to a hydraulic drive system and a valve apparatus for use in hydraulic machines such as civil engineering and construction machines, exemplified by hydraulic excavators, each having a plurality of actuators.

BACKGROUND ART

A hydraulic drive system for use in hydraulic machines such as hydraulic excavators comprises a hydraulic pump, a plurality of hydraulic actuators driven by a hydraulic fluid supplied from the hydraulic pump, and a valve apparatus including a plurality of directional control valves to control respective flow rates of the hydraulic fluid supplied from the hydraulic pump to the plurality of actuators.

In this type hydraulic drive system, load sensing control has been proposed for controlling a delivery pressure of the hydraulic pump in response to the load pressure mainly from the viewpoint of energy saving. Examples of the load sensing control are disclosed in GB 2,195,745A, U.S. Pat. No. 4,425,759, EP 0,366,815A1, etc. In the disclosed prior art, the hydraulic drive system has means for taking out a maximum one of the load pressures of the plural actuators. The plural directional control valves each comprise a supply passage communicating with the hydraulic pump, a load passage communicating with a corresponding one of the actuators, a first passage capable of communicating with the supply passage, a second passage capable of communicating with the first passage and the load passage, a flow control valve for controlling a flow rate of the hydraulic fluid passing between the supply passage and the first passage dependent upon an opening of a variable restrictor positioned therebetween, and also selectively communicating between the first passage and the second passage, and a pressure control valve located between the first passage and the second passage for controlling a pressure inside the first passage. The pressure control valve comprises a valve body having a first pressure receiving sector operative in a valve opening direction and a second pressure receiving sector operative in a valve closing direction, a first control chamber to which the pressure inside the first passage is introduced for causing the introduced pressure to act on the first pressure receiving sector, and a second control chamber to which the maximum load pressure is introduced as a first control pressure for causing the first control pressure to act on the second pressure receiving sector. With such construction of the pressure control valve, the pressure inside the first passage is controlled in response to the maximum load pressure so that a differential pressure across the flow control valve is held at a predetermined value in relation to the load sensing control.

The first and second pressure receiving sectors of the pressure control valve in the above construction are usually, as described in GB 2,195,745A and U.S. Pat. No. 4,425,759, constant in their pressure receiving areas and so is the differential pressure across the flow control valve controlled by the pressure control valve. As a result, flow rate characteristics of the flow control valve cannot be changed. Meanwhile, in the valve body of EP 0,366,815A1, the second pressure receiving sector in the valve closing direction is divided into two central and peripheral pressure receiving sectors, and separate control chambers are provided in association with those two pressure receiving sectors. The maximum load pressure is always introduced to the control chamber associated with the central pressure receiving sector, whereas the maximum load pressure and the reservoir pressure are selectively introduced to the peripheral pressure receiving sector upon a switch valve being actuated. This allows the pressure inside the first passage to be controlled to different values dependent upon whether the maximum load pressure or the reservoir pressure is introduced to the control chamber associated with the peripheral pressure receiving sector. As a result, the differential pressure across the flow control valve is variable to change flow rate characteristics thereof.

However, the prior art described in EP 0,366,815A1 has suffered from the following problem.

First, in the pressure control valve described in EP 0,366,815A1, depending upon whether the maximum load pressure or the reservoir pressure is introduced to the control chamber associated with the peripheral pressure receiving sector, the differential pressure across the flow control valve is variable to change flow rate characteristics thereof as mentioned above. However, the differential pressure across the flow control valve as developed when the reservoir pressure is introduced to the control chamber is, as will be seen from Equation (22) described later, expressed by an equation including the maximum load pressure and thus undergoes an influence of the maximum load pressure. Accordingly, upon change of the maximum load pressure, the differential pressure across the flow control valve is changed and so are the flow rate characteristics thereof. This leads to the problem that the actuator cannot be driven at a desired speed and the operability deteriorates.

The second problem is as follows. In the above prior art, by introducing the reservoir pressure to the control chamber associated with the peripheral pressure receiving sector, the flow rate characteristics can be changed such that the force acting on the valve body in the valve closing direction is reduced to increase the differential pressure across the flow control valve. It is however impossible to decrease the differential pressure across the flow control valve. Accordingly, the flow rate characteristics cannot be varied to lessen the flow rate passing through the flow control valve, meaning that the flow control valve cannot have flow rate characteristics suitable for those works which require fine operation of the actuator as encountered in horizontal drawing of a bucket and fine control of the entire machine.

SUMMARY OF THE INVENTION

An object of the present invention is to provide a hydraulic drive system and a valve apparatus with which differential pressures across flow control valves can be not only kept constant without being mutually affected by any other load pressures, but also changed in their magnitudes optionally.

To achieve the above object, in accordance with the present invention, there is provided a hydraulic drive system comprising a hydraulic fluid supply source, a plurality of hydraulic actuators driven by a hydraulic fluid supplied from said hydraulic fluid supply source, a valve apparatus having a plurality of directional control valves to control flows of the hydraulic fluid supplied from said hydraulic fluid supply source to said plurality of actuators, and means for taking out a maximum load pressure among load pressures of said plurality of actuators, said plurality of directional control valves respectively comprising supply passages communicating with said hydraulic fluid supply source, load passages communicating with associated ones of said actuators, first passages capable of communicating with said supply passages, second passages capable of communicating with said first passages and said load passages, flow control valves for controlling flow rates of the hydraulic fluid passing between said supply passages and said first passages dependent upon openings of variable restricting means disposed therebetween, and also for selectively communicating between said second passages and said load passages, and pressure control valves disposed between said first passages and said second passages for controlling pressures in said first passages, said pressure control valves respectively comprising valve bodies having first pressure receiving sectors operative in a valve opening direction and second pressure receiving sectors operative in a valve closing direction, first control chambers to which the pressures in said first passages are introduced for causing the introduced pressures to act on said first pressure receiving sectors, and second control chambers to which said maximum load pressure is introduced as a first control pressure for causing said first control pressure to act on said second pressure receiving sectors, wherein said hydraulic drive system further comprises first pressure generating means for generating second control pressures different from said first control pressure, and second pressure generating means for generating third control pressures different from said first and second control pressures, and said pressure control valves further respectively having third pressure receiving sectors operative in the valve closing direction and fourth pressure receiving sectors operative in the valve opening direction, said third and fourth pressure receiving sectors being provided on said valve bodies, and also having third control chambers to which said second control pressures are introduced for causing said second control pressures to act on said third pressure receiving sectors, and fourth control chambers to which said third control pressure is introduced for causing said third control pressure to act on said fourth pressure receiving sectors.

Also, in accordance with the present invention, there is provided a valve apparatus provided with the aforesaid pressure control valve.

In the present invention thus arranged, the balance of forces acting on the valve body of each pressure control valve having the first to fourth pressure receiving sectors is expressed by later-described Equations (8) and (9). As will be seen from these Equations, the differential pressures across the flow control valves are held at constant values dependent upon the second and third control pressures without being mutually affected by other load pressures, when the differential pressure between the pressure of the hydraulic fluid supply source and the maximum load pressure is constant. Also, by changing the second and third control pressures, the differential pressures across the flow control valves can be increased and decreased on demand. As a result, the actuators can be driven at desired speeds without being mutually affected by the other load pressures. By changing the differential pressures across the flow control valves, it is further possible to easily obtain desired flow rate characteristics of the flow control valves, thereby improving the operability during operation of the actuators.

BEST MODE FOR CARRYING OUT THE INVENTION

Hereinafter, preferred embodiments of the present invention will be described with reference to the drawings.

FIRST EMBODIMENT

To begin with, a first embodiment of the present invention will be explained by referring to FIGS. 1 to 8. In this embodiment, the present invention is applied to a hydraulic drive system for a hydraulic excavator.

Figure 1:
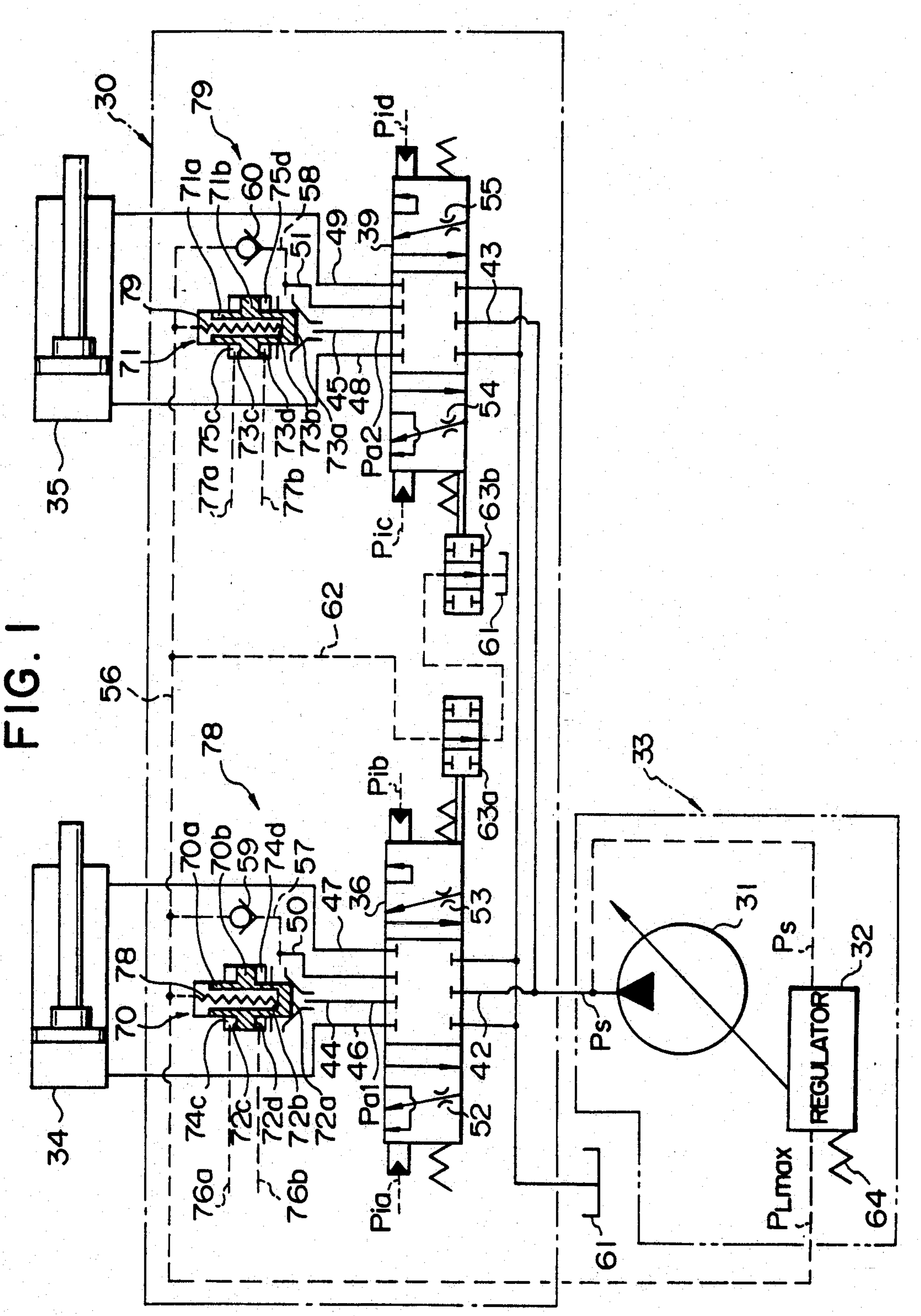
FIG. 1 is a circuit diagram of a hydraulic drive system according to one embodiment of the present invention.

FIG. 1, a hydraulic drive system of this embodiment comprises a hydraulic fluid supply source 33 consisted of a hydraulic pump 31 of variable displacement type and a regulator 32 for controlling a flow rate of a hydraulic fluid delivered from the hydraulic pump 31, a plurality of actuators, e.g., hydraulic cylinders 34, 35, driven with a hydraulic pressure supplied from the hydraulic pump 31, and a valve apparatus 30 located between the hydraulic pump 31 and the hydraulic cylinders 34, 35.

The valve apparatus 30 comprises a directional control valve 78 for controlling a flow of the hydraulic fluid supplied from the hydraulic pump 31 to the hydraulic cylinder 34, and a directional control valve 79 for controlling a flow of the hydraulic fluid supplied from the hydraulic pump 31 to the hydraulic cylinder 35.

The directional control valves 78, 79 respectively have flow control valves 36, 39 of pilot operated type and pressure control valves 70, 71, and also have supply passages 42, 43 both communicating with the hydraulic pump 31, load passages 46, 47 and 48, 49 communicating with the hydraulic cylinders 34, 35, first passages 44, 45 capable of communicating with the supply passages 42, 43, and second passages 50, 51 capable of communicating with the first passages 44, 45 and the load passages 46, 47 and 48, 49. The flow control valves 36, 39 respectively have variable restrictors 52, 53 and 54, 55 positioned between the supply passages 42, 43 and the first passages 44, 45 to control flow rates of the hydraulic fluid passing through the flow control valves dependent upon openings of the variable restrictors, and also serve to selectively communicate the second passages 50, 51 with the load passages 46, 47 and 48, 49. The pressure control valves 70, 71 are respectively located between the first passages 44, 45 and the second passages 50, 51 for controlling the pressures inside the first passages 44, 45.

The valve apparatus 30 further comprises transmission passages 57, 58 communicating with the second passages 50, 51, a first control line 56 capable of communicating with the transmission passages 57, 58, check valves 59, 60 respectively interposed between the transmission passage 57 and the first control line 56 and between the transmission passage 58 and the first control line 56 for preventing the hydraulic fluid from flowing from the first control line 56 toward the second passages 50, 51, a third passage 62 capable of communicating with the first control line 56 with a reservoir 61, and switch valves 63*a*, 63*b* disposed midway of the third passage 62 and operated in cooperation with the flow control valves 36, 39, respectively. The switch valves 63*a*, 63*b* take communicating positions when the flow control valves 36, 39 are in neutral positions, and cut-off positions when they are in operative positions. With operation of the switch valves 63*a*, 63*b* and action of the check valves 59, 60, when the flow control valves 36, 39 are in operative positions, higher one of the load pressures of the hydraulic cylinders 34, 35, i.e., a maximum load pressure PLmax, is taken out as a first control pressure into the first control line 56.

Figure 2:
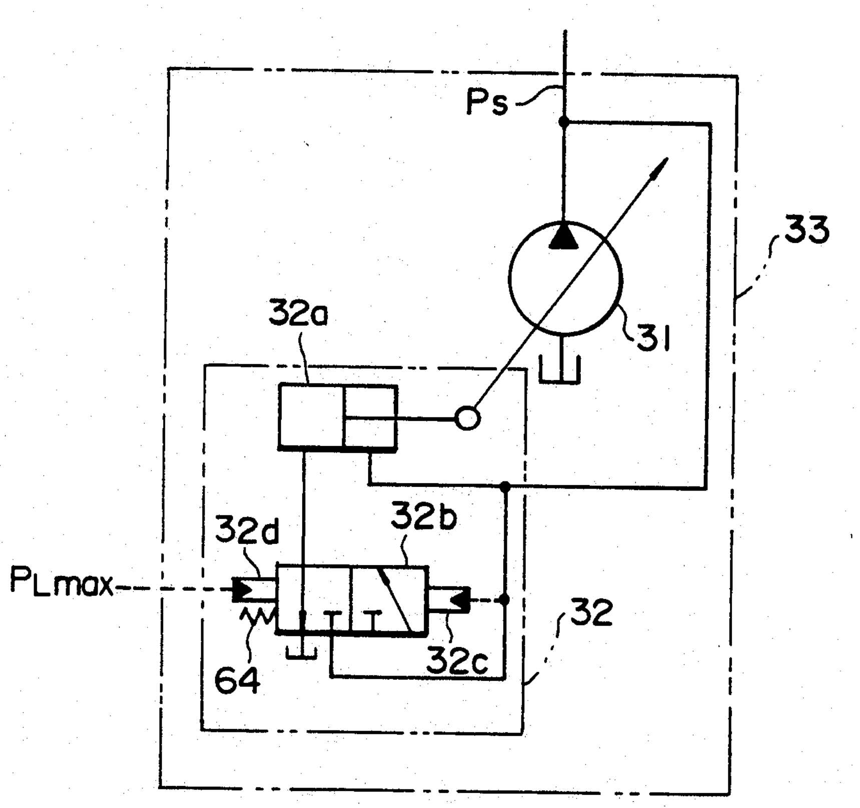
FIG. 2 is a circuit diagram showing details of a pump regulator shown in FIG. 1.

The regulator 32 constituting the hydraulic fluid supply source 33 controls a delivery rate of the hydraulic pump 31 so that a differential pressure ΔPLS (=Ps−PLmax) between the delivery pressure Ps of the hydraulic pump 31 and the maximum load pressure PLmax becomes a predetermined value. To this end, as shown in FIG. 2, the regulator 32 comprises a control actuator 32*a* for controlling the displacement volume of the hydraulic pump 31, and a flow adjusting valve 32*b* for controllably driving the control actuator 32*a*. The flow adjusting valve 32*b* has at one end thereof a drive sector 32*c* which is subjected to the pump delivery pressure Ps, and at the other end thereof both a drive sector 32*d* which is subjected to the maximum load pressure PLmax and a spring 64 for setting a target differential pressure, thereby controlling the delivery rate of the hydraulic pump 31 so that the force produced under the differential pressure ΔPlS is balanced with the force of the spring 64.

The pressure control valves 70, 71 included in the aforesaid directional control valves 78, 79 are constructed as follows.

Figure 3:
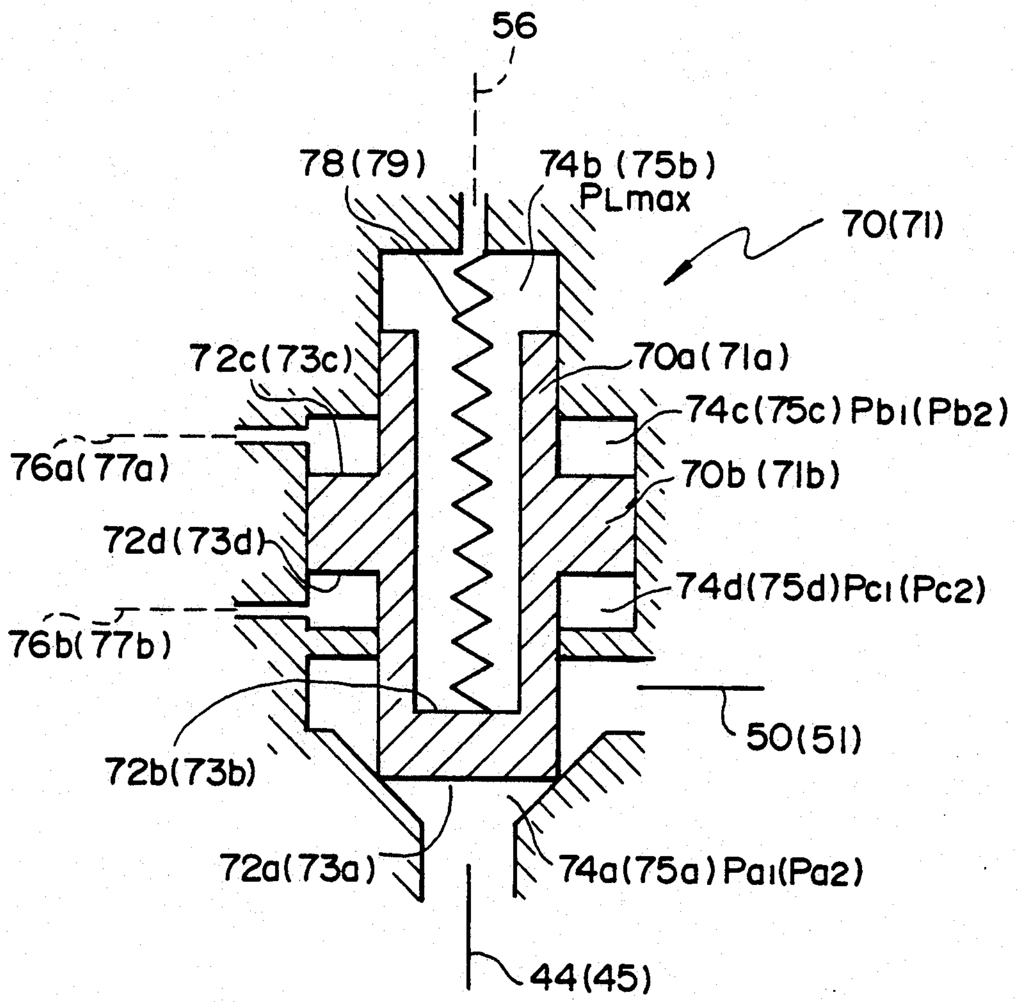
FIG. 3 is an enlarged view of a pressure control valve shown in FIG. 1.

Specifically, as shown in FIGS. 1 and 3, the pressure control valves 70, 71 respectively comprise valve bodies 70*a*, 71*a* of seat valve type having pistons 70*b*, 71*b* on the outer periphery thereof. The valve bodies 70*a*, 71*a* are respectively provided at their opposite ends with first pressure receiving sectors 72*a*, 73*a* operative in a valve opening direction and second pressure receiving sectors 72*b*, 73*b* operative in a valve closing direction, and the pistons 70*b*, 71*b* are provided at their opposite end faces with third pressure receiving sectors 72*c*, 73*c* operative in the valve opening direction and fourth pressure receiving sectors 72*d*, 73*d* operative in the valve closing direction. Further, the pressure control valves 70, 71 respectively comprise first control chambers 74*a*, 75*a* defined in extensions of the first passages 44, 45 for causing the pressures inside the first passages 44, 45 to act on the first pressure receiving sectors 72*a*, 73*a* of the valve bodies 70*a*, 71*a*, second control chambers 74*b*, 75*b* communicated with the first control line 56 for causing the first control pressure (maximum load pressure) PLmax to act on the second pressure receiving sectors 72*b*, 73*b*, third control chambers 74*c*, 75*c* communicated with second control lines 76*a*, 77*a* for causing second control pressures (described later) to act on the third pressure receiving sectors 72*c*, 73*c*, and fourth control chambers 74*d*, 75*d* communicated with third control lines 76*b*, 77*b* for causing third control pressures (described later) to act on the fourth pressure receiving sectors 72*d*, 73*d*. In the second control chambers 74*b*, 75*b*, there are respectively disposed weak springs 78, 79 for holding the valve bodies 70*a*, 71*a* when the flow control valves 36, 39 are in neutral positions.

Figure 4:
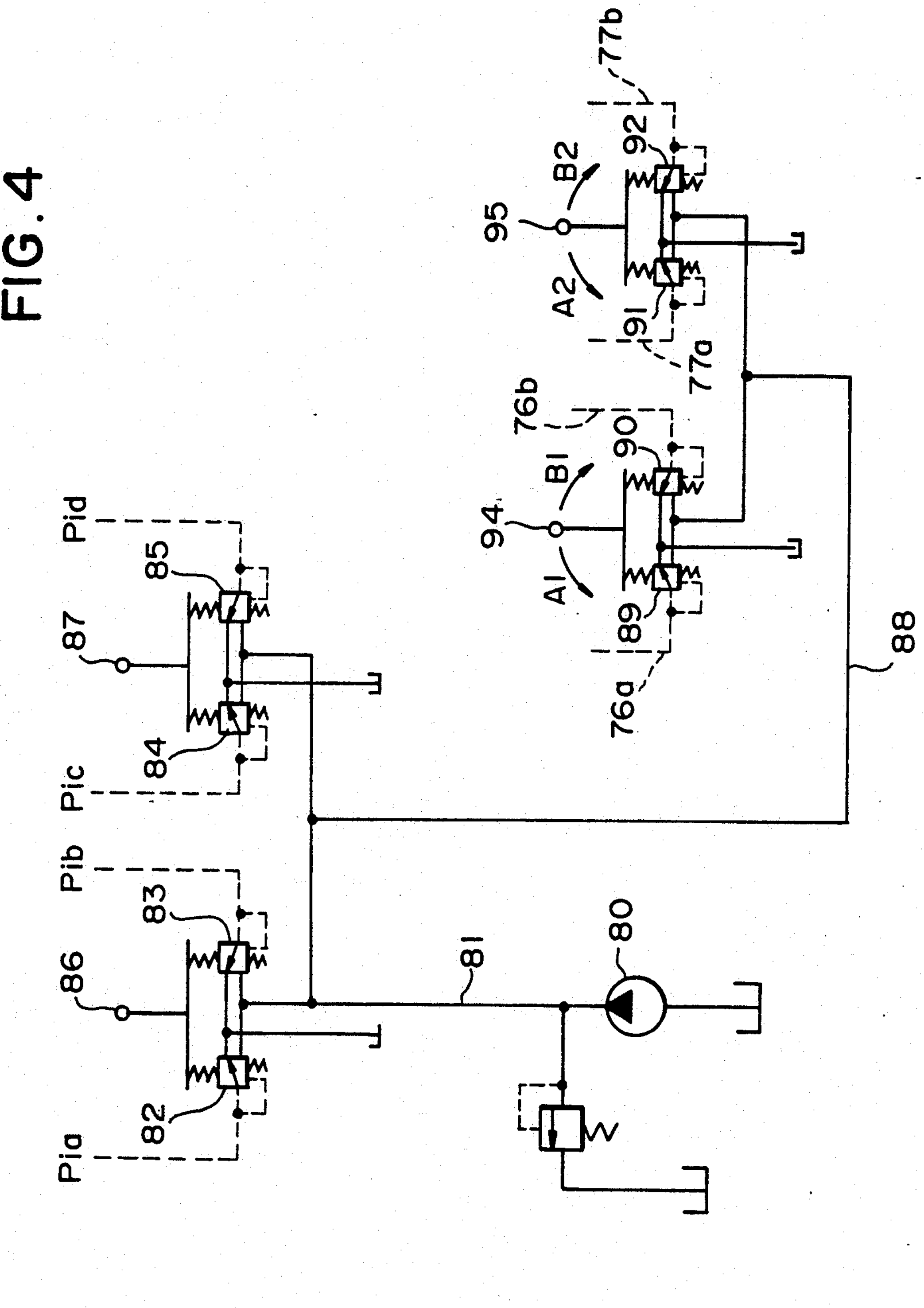
FIG. 4 is a circuit diagram showing a pilot hydraulic system of a valve apparatus shown in FIG. 1.

FIG. 4 shows a pilot hydraulic system for the valve apparatus 30. The pilot hydraulic system for the valve apparatus 30 comprises a pilot pump 80, two sets of pressure reducing valves 82, 83 and 84, 85 connected to the pilot pump 80 via a line 81, and control levers 86, 87 respectively provided in association with the two sets of the pressure reducing valves 82, 83 and 84, 85 to instruct driving of the hydraulic cylinders 34, 35. When the control levers 86, 87 are operated, ones of the pressure reducing valves 82, 83 and 84, 85 are actuated dependent upon the operating direction to produce pilot pressures Pia or Pib and Pic or Pid dependent upon the input amounts of the control levers 86, 87. These pilot pressures introduced to corresponding pilot drive sectors of the flow control valves 36, 39 shown in FIG. 1, whereby the flow control valves 36, 39 are moved to stroke positions corresponding to the magnitudes of the pilot pressures.

The pilot hydraulic system further comprises another two sets of pressure reducing valves 89, 90 and 91, 92 connected to the pilot pump 80 via the line 81 and a line 88, and control levers 94, 95 respectively provided in association with the two sets of the pressure reducing valves 89, 90 and 91, 92 to instruct adjustment of settings of the pressure control valves 70, 71. When the control levers 94, 95 are tilted in directions of A1, A2, the pressure reducing valves 89, 91 are operated so that the second control pressures dependent upon the input amounts of the control levers are produced in the second control lines 76*a*, 77*a* and then introduced to the third control chambers 74*c*, 75*c*, respectively. At this time, since the pressure reducing valves 90, 92 are not operated, the third control lines 76*b*, 77*b* are subjected to the reservoir pressure which is in turn introduced as the third control pressure to the fourth control chambers 74*d*, 75*d*. Accordingly, the valve bodies 70*a*, 71*a* are subjected to forces acting to push them downwardly in FIG. 1, i.e., forces in the valve closing direction. When the control levers 94, 95 are tilted in directions of B1, B2, the pressure reducing valves 90, 92 are operated so that the third control pressures dependent upon the input amounts of the control levers are produced in the third control lines 76*b*, 77*b* and then introduced to the fourth control chambers 74*d*, 75*d*, respectively. At this time, since the pressure reducing valves 89, 91 are not operated, the second control lines 76a, 77a are subjected to the reservoir pressure which is in turn introduced as the second control pressure to the third control chambers 74c, 75c. Accordingly, the valve bodies 70a, 71a are subjected to forces acting to push them upwardly in FIG. 1, i.e., forces in the valve opening direction. In this way, the pair of pressure reducing valve 89 and control lever 94 and the pair of pressure reducing valve 91 and control lever 95 each constitute first pressure generating means which generates the second control pressure, whereas the pair of pressure reducing valve 90 and control lever 94 and the pair of pressure reducing valve 92 and control lever 95 each constitute second pressure generating means which generates the third control pressure.

Operation of this embodiment of the above construction will be described below.

When the control levers 86, 87 shown in FIG. 4 are operated to respectively drive flow control valves 36, 39 of the directional control valves 78, 79 in their shift positions, the hydraulic fluid is introduced from the hydraulic pump 31 to the first passages 44, 45 via the supply passages 42, 43 and the variable restrictors 52 or 53 and 54 or 55, so that the valve bodies 70a, 71a of the pressure control valves 70, 71 are pushed upwardly in FIG. 1 with the pressures inside the first passages 44, 45. The pressure control valves 44, 45 are thus opened, whereupon the hydraulic fluid in the first passages 44, 45 is further supplied to the hydraulic cylinders 34, 35 via the second passages 50, 51 and the load passages 46 or 47 and 48 or 49, thereby simultaneously driving the hydraulic cylinders 34, 35.

During the combined operation of the hydraulic cylinders 34, 35, the load pressure of the hydraulic cylinder 34 is introduced to the second passage 50 and the transmission passage 57 via the load passage 46 or 47, whereas the load pressure of the hydraulic cylinder 35 is introduced to the second passage 51 and the transmission passage 58 via the load passage 48 or 49. The higher one of these load pressures, i.e., the maximum load pressure PLmax, is introduced to the first control line 56 via the check valve 59 or 60 and taken as the first control pressure.

The first control pressure, i.e., the maximum load pressure PLmax, taken into the first control line 56 is introduced to the drive sector 32d of the flow adjusting valve 32b of the regulator 33, causing the hydraulic pump 31 to supply the hydraulic fluid at such a flow rate that the force produced under the differential pressure ΔPLS between the delivery pressure Ps of the hydraulic pump 31 and the maximum load pressure PLmax is balanced with the force of the spring 64. In other words, the delivery rate of the hydraulic pump 31 is controlled in such a manner as to hold the differential pressure ΔPLS between the delivery pressure Ps of the hydraulic pump 31 and the maximum load pressure PLmax at a target differential pressure set by the spring 64.

On the other hand, the first control pressure PLmax taken into the first control line 56 is also applied to the first pressure receiving sectors 72b, 73b of the pressure control valves 70, 71. Furthermore, into the third control chambers 74c, 75c and the fourth control chambers 74d, 75d of the pressure control valves 70, 71, there are respectively introduced the second and third control pressures dependent upon both the operating directions and the input amounts of the control levers 94, 95 shown in FIG. 4. Therefore, the valve bodies 70a, 71a of the pressure control valves 70, 71 are moved into positions where forces produced with the pressures in the first passages 44, 45 act on the first pressure receiving sectors 72a, 73a, forces produced with the first control pressure PLmax act on the second pressure receiving sectors 72b, 73b, forces produced with the second control pressures act on the third pressure receiving sectors 72c, 73c, forces produced with the third control pressures act on the fourth pressure receiving sectors 72d, 73d, and forces of the springs 78, 79 are balanced with one another. For example, the valve body 70a or 71a of the pressure control valve 70 or 71 on the lower load pressure side is lowered from the aforesaid raised state against the pressure in the first passage 44 or 45, whereby the pressures inside the first passage 44 or 45 is controlled to increase.

Assuming now that the pressures inside the first passages 44, 45 and the first control chambers 74a, 75a defined by extensions of the former are Pa1, Pa2, the first control pressure transmitted to the second control chambers 74b, 75b is PLmax as stated above, the second control pressures transmitted to the third control chambers 74c, 75c are Pb1, Pb2, the third control pressures transmitted to the fourth control chambers 74d, 75d are Pc1, Pc2, the spring forces of the springs 78, 79 of the pressure control valves 70, 71 are Fk1, Fk2, the pressure receiving areas of the first pressure receiving sectors 72a, 73a of the valve bodies 70a, 71a are both A, the pressure receiving areas of the second pressure receiving sectors 72b, 73b thereof are also both A, the pressure receiving area of the third pressure receiving sectors 72c, 73c thereof are both B, and the pressure receiving areas of the fourth pressure receiving sectors 72d, 73d thereof are also both B, the balance of forces acting on the valve bodies 70a, 71a of the pressure control valves 70, 71 is expressed below:

$$A(Pa1-PL\max)=Fk1+B(Pc1-Pb1) \quad (1)$$

$$A(Pa2-PL\max)=Fk2+B(Pc2-Pb2) \quad (2).$$

Here, the terms B(Pc1−Pb1) and B(Pc2−Pb2) represent control forces respectively acting on the pistons 70b, 71b of the valve bodies 70a, 71a with the second and third control pressures.

By replacing the terms B(Pc1−Pb1) and B(Pc2−Pb2) as follows;

$$Fp1=B(Pc1-Pb1)$$

$$Fp2=B(Pc2-Pb2)$$

above Equations (1) and (2) are rewritten below:

$$A(Pa1-PL\max)=Fk1+Fp1 \quad (3)$$

$$A(Pa2-PL\max)=Fk2+Fp2 \quad (4).$$

On the other hand, given the differential pressure between the delivery pressure Ps of the hydraulic pump 31 and the maximum load pressure PLmax, which is under the control of the regulator 32, being ΔPLS, this is expressed below:

$$Ps-PL\max=\Delta PLS \quad (5).$$

From this Equation (5) and above Equations (3), (4), the differential pressures across the flow control valves 36, 39 are expressed below:

$$Ps-Pa1=\Delta PLS-\{(Fk1+Fp1)/A\} \quad (6)$$

$$Ps-Pa2=\Delta PLS-\{(Fk2+Fp2)/A\} \quad (7).$$

Here, since the springs 78, 79 serve to hold the valve bodies 70*a*, 71*a* at their closed positions when the flow control valves 36, 39 are in neutral positions, their spring forces Fk1, Fk2 are only required to be very small. Accordingly, ignoring Fk1 and Fk2, above Equations (6) and (7) are rewritten below:

$$Ps-Pa1=\Delta PLS-(Fp1/A) \quad (8)$$

$$Ps-Pa2=\Delta PLS-(Fp2/A) \quad (9).$$

In above Equations (8) and (9), so long as the hydraulic pump is not saturated, the differential pressure ΔPLS is held at a constant value under the control of the regulator 32 as mentioned above. Also, since the second and third control pressures Pb1, Pb2 and Pc1, Pc2 are constant so long as the control levers 94, 95 shown in FIG. 4 remain not moved, the control forces Fp1 and Fp2 also become constant. It is therefore understood that the differential pressures Ps−Pa1, Ps−Pa2 across the flow control valves 36, 39 are held at constant values dependent upon the control forces Fp1, Fp2 without being mutually affected by the other load pressure.

Further, the second control pressures Pb1, Pb2 and the third control pressures Pc1, Pc2 can be set to any desired values by operating the control levers 94, 95 shown in FIG. 4, respectively. For example, when the control levers 94, 95 are held at neutral positions, the second control pressures Pb1, Pb2 and the third control pressures Pc1, Pc2 all become the reservoir pressure. Accordingly, the relationship of Pb1=Pc1 and Pb2=Pc2 leads to:

$$Ps-Pa1=\Delta PLS \quad (10)$$

$$Ps-Pa2=\Delta PLS \quad (11).$$

When the control levers 94, 95 are operated in the directions of A1, A2, respectively, the second control pressures Pb1, Pb2 take values dependent upon the input amounts of the control levers and the third control pressures Pc1, Pc2 become the reservoir pressure. Accordingly, the second control pressures Pb1, Pb2 are larger than the third control pressures Pc1, Pc2, i.e., Pb1>Pc1 and Pb2>Pc2, which leads to:

$$Ps-Pa1<\Delta PLS \quad (12)$$

$$Ps-Pa2<\Delta PLS \quad (11).$$

When the control levers 94, 95 are operated in the directions of B1, B2, respectively, the second control pressures Pb1, Pb2 become the reservoir pressure and the third control pressures Pc1, Pc2 take values dependent upon the input amounts of the control levers. Accordingly, the second control pressures Pb1, Pb2 are smaller than the third control pressures Pc1, Pc2, i.e., Pb1<Pc1 and Pb2<Pc2, which leads to:

$$Ps-Pa1>\Delta PLS \quad (14)$$

$$Ps-Pa2>\Delta PLS \quad (15).$$

In this way, the differential pressures across the flow control valves 36, 39 can be increased and decreased by changing the second control pressures Pb1, Pb2 and third control pressures Pc1, Pc2.

Figure 5:
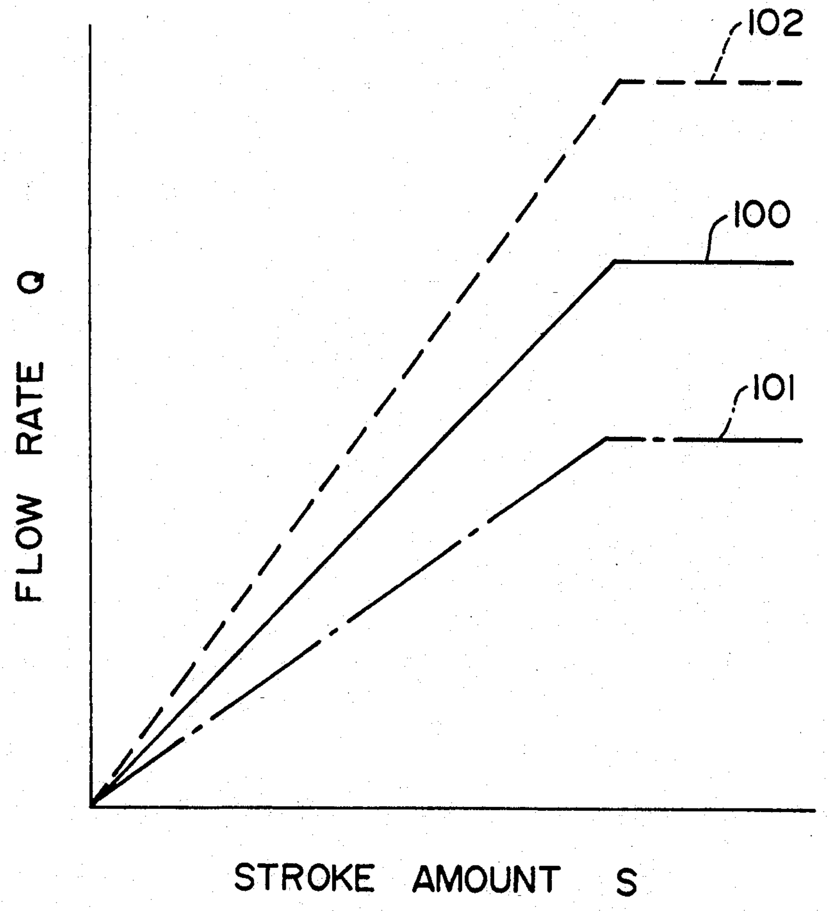
FIG. 5 is a graph showing flow rate characteristics of the valve apparatus shown in FIG. 1.

Because the flow rates of the hydraulic fluid passing through the variable restrictors 54, 55 of the flow control valves 36, 39 are functions of both the openings of the variable restrictors 54, 55 and the differential pressures across them, characteristics of flow rates Q versus stroke amounts S of the flow control valves 36, 39 are varied as shown in FIG. 5. More specifically, in FIG. 5, a characteristic line 100 indicated by a solid line represents the case where the differential pressures across the flow control valves 36, 39 are set equal to the differential pressure ΔPLS as expressed by above Equations (10) and (11). A characteristic line 101 indicated by a one-dot-chain line represents the case where the differential pressures across the flow control valves 36, 39 are set smaller than the differential pressure ΔPLS as expressed by above Equations (12) and (13). A characteristic line 102 indicated by a broken line represents the case where the differential pressures across the flow control valves 36, 39 are set larger than the differential pressure ΔPLS as expressed by above Equations (14) and (15).

As will be seen from FIG. 5, by changing the magnitudes of the differential pressures across the flow control valves 36, 39, the flow rate characteristics with respect to the stroke amounts S of the flow control valves 36, 39 are varied so as to select the optimum flow rate characteristic dependent upon the type of works required, for driving the hydraulic cylinders 34, 35.

The foregoing operation of this embodiment will now be compared with that of the conventional valve apparatus described in EP 0,366,815A1. First, the structure of the conventional valve apparatus is explained with reference to FIG. 6. In the drawing, the identical components to those in FIG. 1 are denoted by the same reference numerals.

Figure 6:
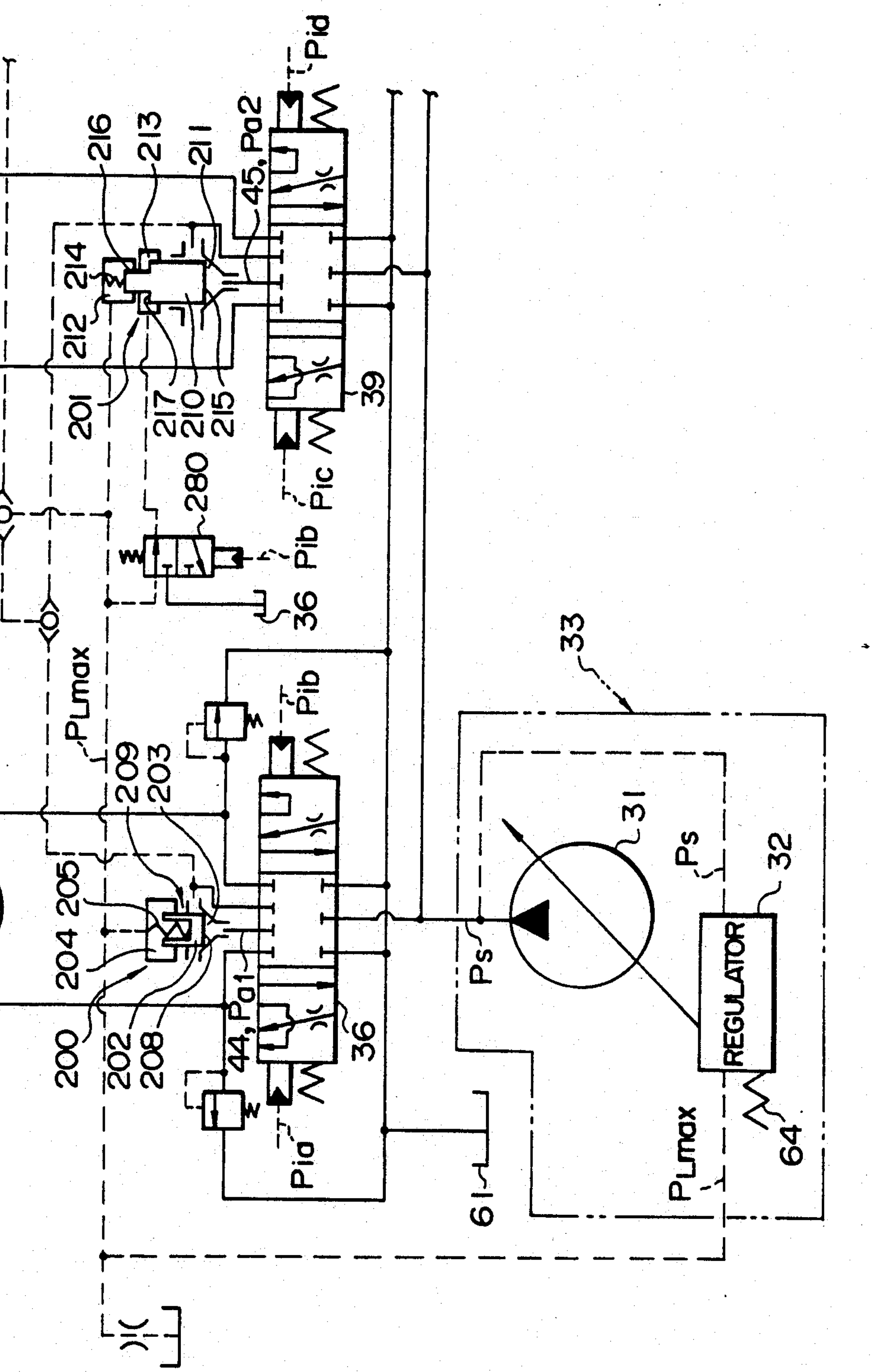
FIG. 6 PRIOR ART
FIG. 6 is a circuit diagram of a conventional hydraulic drive system.

Referring to FIG. 6, a pressure control valve 200 has a valve body 202 of seat valve type, a first control chamber 203 for urging the valve body 202 in a valve opening direction, and a second control chamber 204 for urging the valve body 202 in a valve closing direction. The pressure in a first passage 44 is introduced to the first control chamber 203 and the maximum load pressure PLmax is introduced to the second control chamber 204. Additionally, a spring 205 is disposed in the second control chamber 204. A first pressure receiving sector 208 located in the first control chamber 203 of the valve body 202 and a second pressure receiving sector 209 located in the second control chamber 204 of the valve body 202 have the same area.

On the other hand, a pressure control valve 201 has a valve body 210 of seat valve type, a first control chamber 211 for urging the valve body 210 in a valve opening direction, and second and third control chambers 212, 213 for urging the valve body 210 in a valve closing direction. The pressure in a first passage 45 is introduced to the first control chamber 211, the maximum load pressure PLmax is introduced to the second control chamber 212, and further the maximum load pressure PLmax or the reservoir pressure is selectively introduced to the third control chamber 213 upon shifting of a switch valve 280. Additionally, a spring 214 is disposed in the second control chamber 212. A first pressure receiving sector 215 located in the first control chamber 211 of the valve body 210 and second and third pressure receiving sectors 216, 217 respectively located in the second and third control chambers 212, 213 of the valve body 210 are selected such that total area of the second and third pressure receiving sectors 216, 217 is equal to an area of the first pressure receiving sector 215.

The switch valve 280 is shifted with a pilot pressure Pia or Pib for driving the flow control valve 36, from an illustrated position where the maximum load pressure PLmax is introduced therethrough, to a position where the reservoir pressure is introduced therethrough.

In the above construction, assuming that the pressure receiving areas of the first and second pressure receiving sectors 208, 209 of the pressure control valve 200 and the first pressure receiving sector 215 of the pressure control valve 201 are all the same A, the pressure receiving area of the second pressure receiving sector 216 of the pressure control valve 201 is A1, the pressure receiving area of the third pressure receiving sector 216 of the pressure control valve 201 is A2, the spring forces of the springs 205, 214 are respectively Fk1, Fk2, and the pressure in the third control chamber 213 is Pi, the balance of forces acting on the valve bodies 202, 210 is expressed below:

$$A(Pa1-PLmax)=Fk1 \quad (16)$$

$$A{\cdot}Pa2-(A1{\cdot}PLmax+A2{\cdot}Pi)=Fk2 \quad (17).$$

Here, when the switch valve 280 is in the illustrated position, Pi=PLmax holds in above Equation (17). From the relationships of Ps−PLmax=ΔPLS and A=A1+A2, the differential pressures across the flow control valves 36, 39 are expressed by:

$$Ps-Pa1=\Delta PLS-(Fk1/A) \quad (18)$$

$$Ps-Pa2=\Delta PLS-(Fk2/A) \quad (19).$$

Ignoring the spring forces Fk1, Fk2 of the springs 205, 214 for the same reason as this embodiment, above Equations (18) and (19) are rewritten below:

$$Ps-Pa1=\Delta PLS \quad (20)$$

$$Ps-Pa2=\Delta PLS \quad (21).$$

Meanwhile, when the switch valve 280 is shifted from the illustrated position to the other position with the pilot pressure Pia or Pib, Pi=0 now holds and, therefore, above Equation (17) is rewritten below on the assumption that Fk2 is very small:

$$Ps-Pa2=\Delta PLS+(A2/A){\cdot}PLmax \quad (22).$$

As will be seen from above Equation (22), the differential pressure Ps−Pa2 across the flow control valve 39 can be increased by introducing the reservoir pressure to the third control chamber 213 of the pressure control valve 210.

However, the aforementioned prior art has the following problems. First, the left side of above Equation (22) includes the term PLmax, i.e., the maximum load pressure of the actuators 34, 35, meaning that the differential pressure Ps−Pa2 across the flow control valve 39 is affected by the maximum load pressure PLmax. Accordingly, during the sole operation of the actuator 35, the differential pressure Ps−Pa2 across the flow control valve 39 is varied upon change of its own load pressure (=PLmax). Also, during the combined operation of the actuators 34, 35, the differential pressure Ps−Pa2 across the flow control valve 39 is varied upon change of the maximum load pressure PLmax. In either case, the flow rate characteristics of the flow control valve 39 are changed dependent upon PLmax, whereby the actuator 35 cannot be driven at a desired speed.

Secondly, since the term (A2/A)·PLmax in the right side of above Equation (22) is always positive, the differential pressure Ps−Pa2 across the flow control valve 39 can be made larger, but not smaller. Consequently, the flow rate characteristics cannot be modified in a direction to reduce the flow rate passing through the flow control valve 39, resulting in difficulties in those works which require fine operation of actuators.

On the contrary, with this embodiment, the differential pressures Ps−Pa1, Ps−Pa2 across the flow control valves 36, 39 can be not only kept constant but also freely changed without being mutually affected by the other load pressure. As a result, it is possible to drive the hydraulic cylinders 34, 35 at desired speeds and to realize the flow rate characteristics optimum for individual works required, including those works which require fine operation of actuators, for thereby improving the operability.

Several examples of works feasible by this embodiment will be described below to clarify an advantageous effect of this embodiment.

Figure 7:
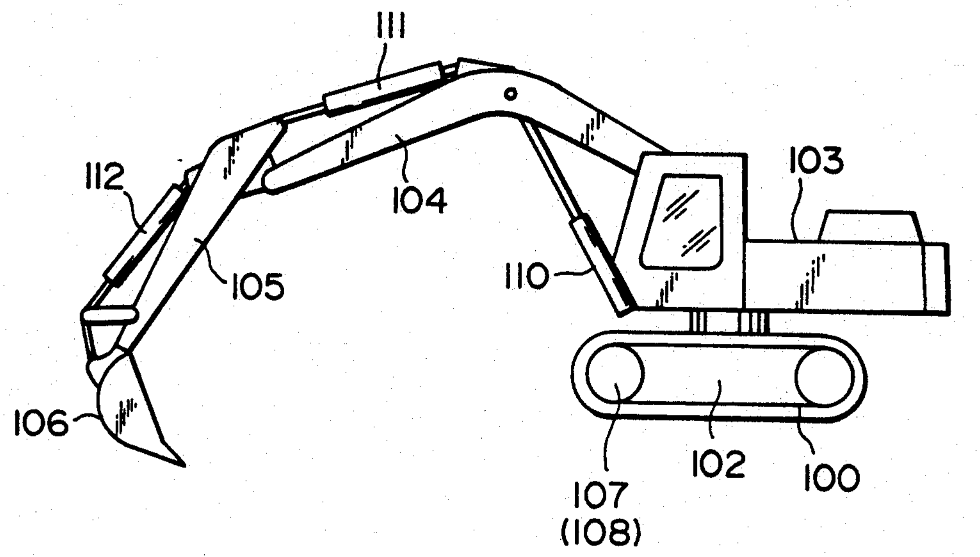
FIG. 7 is a side view of a hydraulic excavator mounting thereon the hydraulic drive system shown in FIG. 1.
Figure 8:
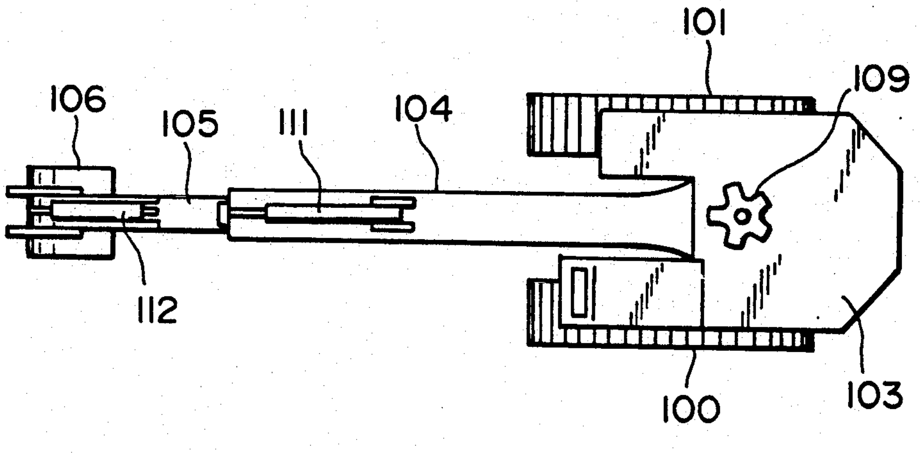
FIG. 8 is a plan view of the hydraulic excavator shown in FIG. 7.

First, the construction of a hydraulic excavator mounting thereon the hydraulic drive system of this embodiment will be described with reference to FIGS. 7 and 8. The hydraulic excavator comprises a lower travel body 102 including a pair of left and right crawler belts 100, 101, an upper swing 103 mounted on the lower travel body 102 in such a manner as able to swivel, and a boom 104, an arm 105 as well as a bucket 106 which jointly constitute a front attachment mounted to the upper swing 103. The left and right crawler belts 100, 101, the swing 103, the boom 104, the arm 105 and the bucket 106 are respectively driven by left and right travel motors 107, 108, a swing motor 109, a boom cylinder 110, an arm cylinder 111 and a bucket cylinder 112. In association with all these actuators, there are provided the same ones as the directional control valves 78, 79 including the pressure control valve 70, 71 shown in FIG. 1.

In the hydraulic excavator of the above construction, when the boom 104, the arm 105 and the bucket 106 are operated to carry out a horizontal drawing work to move the bucket 106 horizontally, the arm 105 is required to be operated in a fine manner. In an attempt of performing this type work, supposing the hydraulic cylinder 34 shown in FIG. 1 to be the arm cylinder 111, the control lever 94 shown in FIG. 4 is operated in the direction of A1 to produce in the second control line **76*a* the second control pressure dependent upon the input amount of the control lever. The second control pressure gives rise to a force acting to push the piston 70*b* of the valve body 7C*a* downwardly in the drawing so that, as stated above, the differential pressure Ps−Pal across the flow control valve 36 is reduced to provide the flow rate characteristics of the flow control valve 36 as indicated by 101 in FIG. 5. The flow rate passing through the flow control valve 36 with respect to the stroke amount of the flow control valve 36 (the input amount of the control lever 86) is thereby made smaller to enable the fine operation of the arm 105, allowing the bucket 106** to easily carry out the horizontal drawing work.

Further, when performing the so-called fine control in which the entire machine is to be finely operated, the control levers 94, 95 . . . for the pressure control valves 70, 71 . . . associated with all the actuators are operated in the directions of A1, A2 . . . to produce in the second control lines 76*a*, 77*a* . . . the respective second control pressures dependent on the control levers. As a result, for the same reason as in the above case of the horizontal drawing work, the flow rates passing through the flow control valves 36, 39 . . . are reduced to enable the fine control.

When swiveling the swing 103 and raising the boom 104 at the same time, it is required that priority is given to the boom 104 for sufficiently raising the boom 104. In this case, supposing the hydraulic cylinder 34 to be replaced with the swing motor 109 and the hydraulic cylinder 35 to be the boom cylinder 110, the control lever 95 is operated in the direction of B2 in FIG. 4 to produce in the third control line 77*b* the third control pressure dependent upon the input amount of the control lever. The third control pressure gives rise to a force acting to push the valve body 71*a* of the pressure control valve 71 upwardly in the drawing so that, as stated above, the differential pressure Ps−Pa2 across the flow control valve 39 is increased to provide the flow rate characteristics of the flow control valve 39 as indicated by 102 in FIG. 5. Consequently, the flow rate passing through the flow control valve 39 with respect to the stroke amount of the flow control valve 39 (the input amount of the control lever 86) is made larger. The flow rate passing through the flow control valve 39 is thereby increased to supply the hydraulic fluid to the boom cylinder 110 at a sufficient flow rate, enabling an operator to raise the boom 104.

OTHER EMBODIMENTs

Figure 9:
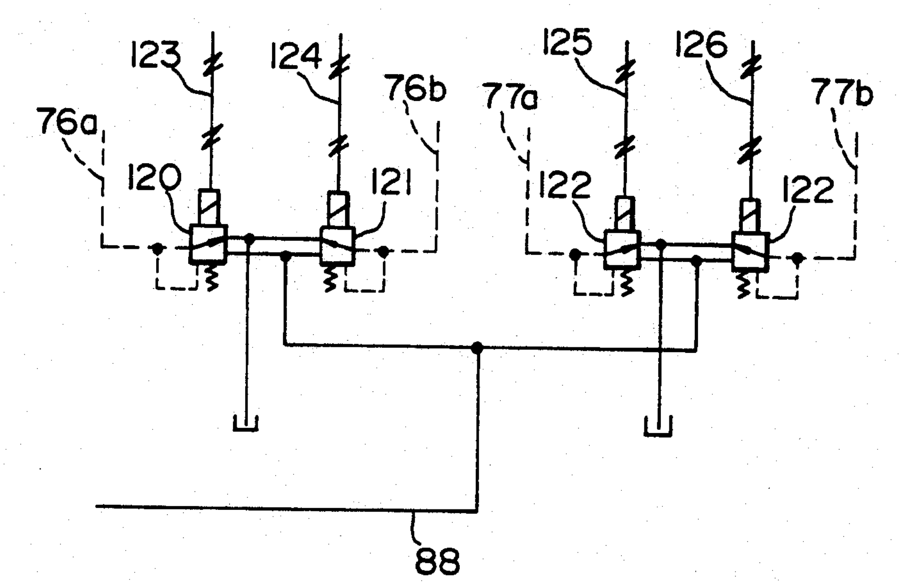
FIG. 9 is a circuit diagram showing another embodiment of the pilot hydraulic system of the valve apparatus.

Next, another embodiment of the present invention will be described with reference to FIGS. 9 to 11.

In the foregoing embodiment, the second and third control pressure generating means are constituted by a combination of the control levers 94, 95 and the pressure reducing valves 90, 91 and 92, 93, respectively. FIG. 9 shows another embodiment in this respect. Specifically, solenoid proportional reducing valves 120 and 122 are used in place of the pressure reducing valves, and electric signals are applied to their solenoids via signal lines 123 to 126. Depending on the electric signals, the solenoid proportional reducing valves 120 to 122 produce the second and third control pressures which are introduced to the third and fourth control chambers of the pressure control valves 70, 71 (see FIG. 1) via the second control lines 76*a*, 77*a* and the third control lines 76*b*, 77*b*.

Figure 10:
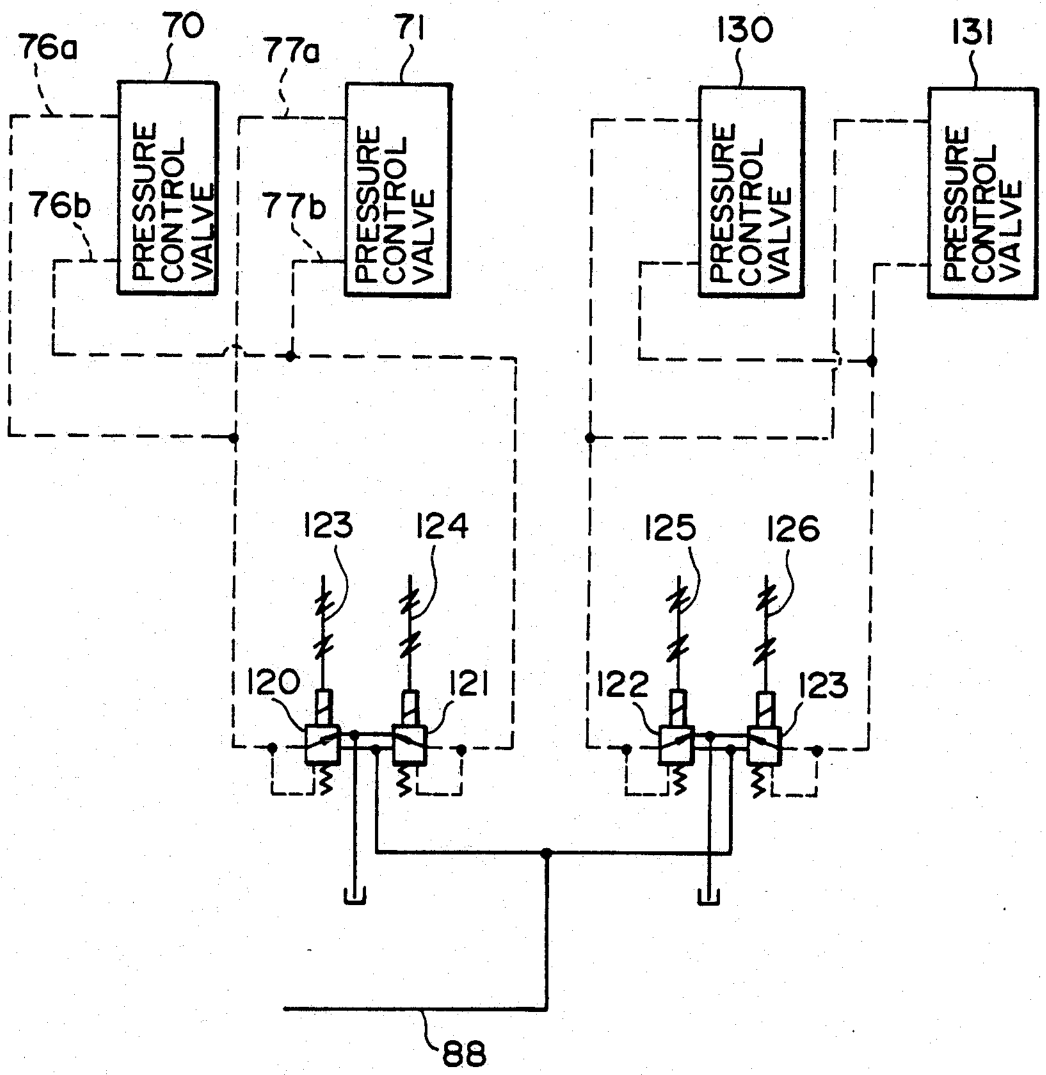
FIG. 10 is a circuit diagram showing still another embodiment of the pilot hydraulic system of the valve apparatus.

FIG. 10 shows still another embodiment of the pressure generating means, in which one pair of solenoid proportional reducing valves 120, 121 are commonly provided for the two pressure control valves 70, 71 and the other pair of solenoid proportional reducing valves 122, 123 are commonly provided for the other two pressure control valves 130, 131. The second control pressure created by the solenoid proportional reducing valves 120 is introduced to the third control chambers 74*c*, 75*c* (see FIG. 1) of the pressure control valves 70, 71, whereas the third control pressure created by the solenoid proportional reducing valves 121 is introduced to the fourth control chambers 74*d*, 75*d* (see FIG. 1) of the pressure control valves 70, 71. Likewise, the second control pressure created by the solenoid proportional reducing valves 122 is introduced to third control chambers (not shown) of the pressure control valves 130, 131, whereas the third control pressure created by the solenoid proportional reducing valves 123 is introduced to fourth control chambers (not shown) of the pressure control valves 130, 131.

Figure 11:
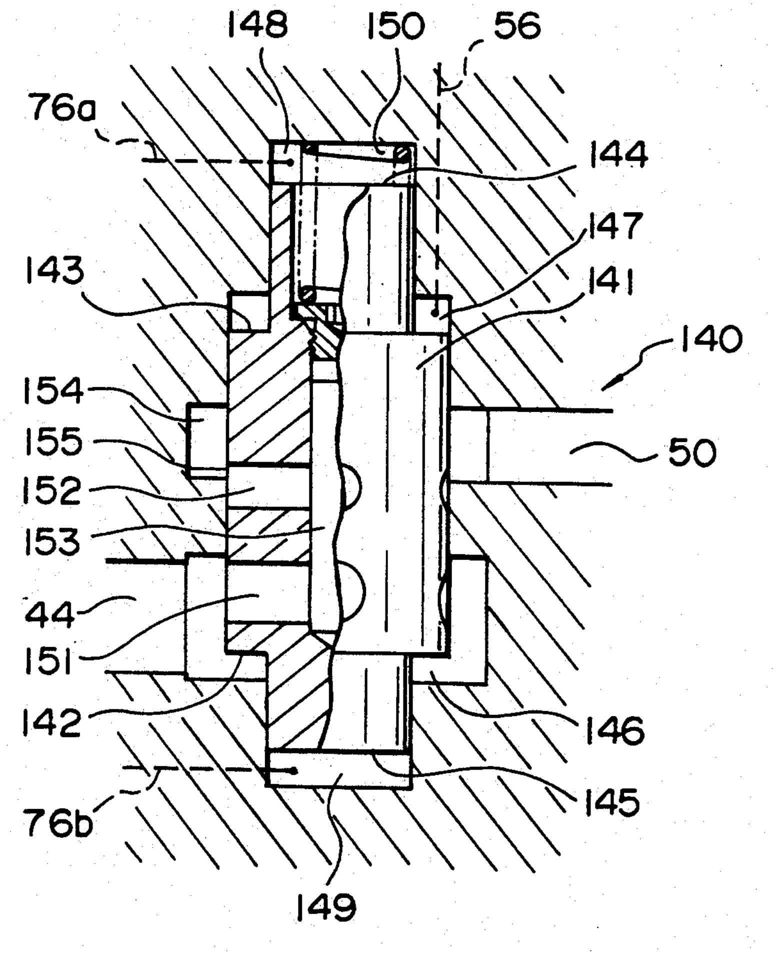
FIG. 11 is a partial sectional view showing another embodiment of the pressure control valve.

Another embodiment of the pressure control valve will be next explained by referring to FIG. 11. While the valve bodies 70*a*, 71*a* of the pressure control valves 70, 71 are seat valve type in the foregoing embodiment, spool type valve bodies are used in this embodiment. More specifically, in FIG. 11, a pressure control valve 140 of this embodiment has a valve body 141 of spool type, the valve 140 including a first pressure receiving sector 142 operative in a valve opening direction and a second pressure receiving sector 143 operative in a valve closing direction which are formed by step portions on the outer periphery of the valve body 141, and a third pressure receiving sector 144 operative in the valve closing direction and a fourth pressure receiving sector 145 operative in the valve opening direction which are formed by opposite ends of the valve body 141. A first control chamber 146 associated with the first pressure receiving sector 142 is defined as an extension of the first passage 44. The first control pressure (maximum load pressure) PLmax is applied via the first control line 56 to a second control chamber 147 associated with the second pressure receiving sector 143, the second control pressure is applied via the second control line 76*a* to a third control chamber 148 associated with the third pressure receiving sector 144, and further the third control pressure is applied via the third control line 76*b* to a fourth control chamber 149 associated with the fourth pressure receiving sector 145. Additionally, in the third control chamber 148, there is disposed a spring 150 for holding the valve body 141 at a closed position when the corresponding flow control valve (not shown) is in a neutral position.

The valve body 141 has formed therein a plurality of radial passages 151 always communicating with the first passage 44, a plurality of radial passages 152 forming a variable restrictor 155 in cooperation with an annular groove 154, communicating with the second passage 50, dependent upon an amount of axial movement of the valve body 141, and an axial passage 153 for communicating those two sets of radial passages 151 and 152 with each other.

With the above construction, the first and second pressure receiving sectors 142, 143 have their pressure receiving areas equal to each other. The first pressure receiving sector 142 is subjected to a force produced with the pressure Pal in the first passage 44 for pushing the valve body 141 upwardly in the drawing, and the second pressure receiving sector 143 is subjected to a force produced with the maximum load pressure PLmax introduced to the second control chamber 147 for pushing the valve body 141 downwardly in the drawing. Further, the third pressure receiving sector 144 is subjected to a force produced with the second control pressure introduced to the third control chamber 148 for pushing the valve body 141 downwardly in the drawing, and the fourth pressure receiving sector 145 is subjected to a force produced with the third control pressure introduced to the fourth control chamber 149 for pushing the valve body 141 upwardly in the drawing. While taking the balance of the above hydraulic forces and a resilient force of the spring 50, the valve body 141 is moved in the valve opening direction, whereupon the hydraulic fluid in the first passage 44 is introduced to the passages 152 via the passages 151, 153. Thereafter, the fluid flows into the corresponding actuator via the variable restrictor 155, the annular passage 154 and the second passage 50.

In a valve apparatus using a plurality of the pressure control valves 140 of the above construction, aforementioned Equations (1) to (15) are established and, therefore, the similar advantage to the above embodiment can be obtained.

INDUSTRIAL APPLICABILITY

According to the present invention, the differential pressures across the flow control valves are held at constant values dependent upon the second and third control pressures without being mutually affected by other load pressures, when the differential pressure between the pressure of the hydraulic fluid supply source and the maximum load pressure is constant. Also, by changing the second and third control pressures, the differential pressures across the flow control valves can be increased and decreased on demand. As a result, actuators can be driven at desired speeds without being mutually affected by the other load pressures. By changing the differential pressures across the flow control valves, it is further possible to obtain flow rate characteristics of the flow control valves at an optimum for the type of works required, thereby improving the operability of the system.

We claim:

1. A hydraulic drive system comprising a hydraulic fluid supply source, a plurality of hydraulic actuators driven by a hydraulic fluid supplied from said hydraulic fluid supply source, a valve apparatus having a plurality of directional control valves to control flows of the hydraulic fluid supplied from said hydraulic fluid supply source to said plurality of actuators, and means for taking out a maximum load pressure among load pressures of said plurality of actuators, said plurality of directional control valves respectively comprising supply passages communicating with said hydraulic fluid supply source, load passages communicating with associated ones of said actuators, first passages capable of communicating with said supply passages, second passages capable of communicating with said first passages and said load passages, flow control valves for controlling flow rates of the hydraulic fluid passing between said supply passages and said first passages dependent upon openings of variable restricting means disposed therebetween, and also for selectively communicating between said second passages and said load passages, and pressure control valves disposed between said first passages and said second passages for controlling pressures in said first passages, said pressure control valves respectively comprising valve bodies having first pressure receiving sectors operative in a valve opening direction and second pressure receiving sectors operative in a valve closing direction, first control chambers to which the pressures in said first passages are introduced for causing the introduced pressures to act on said first pressure receiving sectors, and second control chambers to which said maximum load pressure is introduced as a first control pressure for causing said first control pressure to act on said second pressure receiving sectors, wherein:

said hydraulic drive system further comprises first pressure generating means for generating second control pressures different from said first control pressure, and second pressure generating means for generating third control pressures different from said first and second control pressures, and said pressure control valves further respectively having third pressure receiving sectors operative in the valve closing direction and fourth pressure receiving sectors operative in the valve opening direction, said third and fourth pressure receiving sectors being provided on said valve bodies, and also having third control chambers to which said second control pressures are introduced for causing said second control pressures to act on said third pressure receiving sectors, and fourth control chambers to which said third control pressures are introduced for causing said third control pressures to act on said fourth pressure receiving sectors.

2. A hydraulic drive system according to claim 1, wherein said first and second pressure generating means respectively include first and second pressure reducing valves connected to a pilot hydraulic source and operated by control levers.

3. A hydraulic drive system according to claim 1, wherein said first and second pressure generating means respectively include first and second solenoid proportional reducing valves connected to a pilot hydraulic source and operated by electric signals.

4. A hydraulic drive system according to claim 1, wherein said first and second pressure generating means are provided in one to one relation to said pressure control valves.

5. A hydraulic drive system according to claim 1, wherein said first and second pressure generating means are each provided commonly to plural ones of said pressure control valves.

6. A hydraulic drive system according to claim 1, wherein said valve bodies of said pressure control valves are of the seat valve type and wherein the hydraulic fluid in said first passages flows into said second passages while pushing said valve bodies upwardly.

7. A hydraulic drive system according to claim 1, wherein said valve body of said pressure control valve is of the spool type and wherein the hydraulic fluid in said first passage flows into said second passage while passing through a variable restrictor formed between said valve body and a circumferential groove surrounding said valve body.

8. A valve apparatus having a plurality of directional control valves to control flows of a hydraulic fluid to a plurality of actuators, said plurality of directional control valves respectively comprising supply passages communicating with a source of hydraulic fluid, load passages communicating with associated ones of said actuators, first passages capable of communicating with said passages, second passages capable of communicating with said first passages and said load passages, flow control valves for controlling flow rates of a hydraulic fluid passing between said supply passages and said first passages dependent upon openings of variable restricting means disposed therebetween, and also for selectively communicating between said second passages and said load passages, and pressure control valves disposed between said first passages and said second passages for controlling pressures inside said first passages, said pressure control valves respectively comprising valve bodies having first pressure receiving sectors operative in a valve opening direction and second pressure receiving sectors operative in a valve closing direction, first control chambers to which the pressures in said first passages are introduced for causing the introduced pressures to act on said first pressure receiving sectors, and second control chambers to which a maximum load pressure among load pressures among load pressures of said plural actuators is introduced as a first control pressure for causing said first control pressure to act on said second pressure receiving sectors, wherein:

said pressure control valves further respectively have third pressure receiving sectors operative in the valve closing direction and fourth pressure receiving sectors operative in the valve opening direction, said third and fourth pressure receiving sectors being provided on said valve bodies, third control chambers to which second control pressures different from said first control pressure are introduced for causing said second control pressures to act on said third pressure receiving sectors, and fourth control chambers to which third control pressures different from said first and second control pressures are introduced for causing said third control pressures to act on said fourth pressure receiving sectors.

9. A valve apparatus according to claim 8, wherein said valve bodies of said pressure control valves are of the seat valve type and wherein the hydraulic fluid in said first passages flows into said second passages while pushing said valve bodies upwardly.

10. A valve apparatus according to claim 8, wherein said valve body of said pressure control valve is of the spool type and wherein the hydraulic fluid in said first passage flows into said second passage while passing through a variable restrictor formed between said valve body and a circumferential groove surrounding said valve body.

* * * * *